United States Patent Office 3,362,875
Patented Jan. 9, 1968

3,362,875
N⁴,N⁴′ - DECAMETHYLENE - BIS(4 - AMINO) - QUIN-
ALDINE DIACETATE COMPOSITIONS FOR CON-
TROLLING TOPICAL INFECTIONS
Robert R. Strauss, Cheltenham, and Paul D. Rosenstock,
Philadelphia, Pa., assignors to Richardson-Merrell Inc.,
New York, N.Y., a corporation of Delaware
No Drawing. Filed June 4, 1965, Ser. No. 461,531
2 Claims. (Cl. 167—58)

This invention relates to new compositions of matter useful for controlling topical infections by bacteria, fungi, and other microorganisms. The invention includes the active compound, methods of preparing the same, compositions of matter containing the active compound, and methods of using these new compositions in the control of topical infections.

The new compound of this invention is the water soluble diacetate salt of N⁴,N⁴′-decamethylene-bis-(4-amino-quinaldine). It is usually obtained in the form of a dihydrate. More particularly the compound of this invention has the following structure:

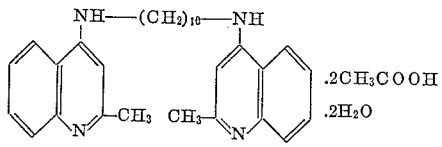

This diacetate-dihydrate salt of N⁴,N⁴′-decamethylene-bis-(4-aminoquinaldine) shows high antimicrobial activity with low topical toxicity. In contrast to the high order of activity against *Pseudomonas aeruginosa* shown by this salt, the free base of this compound (a known compound) is relatively inactive having only one-fourth the activity of the above salt. It is well known that *Pseudomonas aeruginosa* is refractory to most chemotherapeutic agents.

It is an object of this invention, therefore, to provide a broad spectrum antimicrobial agent effective against both gram positive and gram negative bacteria, filamentous and yeast-like fungi and the parasitic protozoan *Trichomonas vaginalis*. In vitro activity is not adversely effected in the presence of 10 percent normal serum. Compositions of matter useful in topical treatment of skin, mouth, nose, ear, and other infections caused by a wide variety of pathogens are also included within the scope of the invention.

The in vitro antibacterial spectrum of N⁴,N⁴′-decamethylene-bis-(4-aminoquinaldine) diacetate - dihydrate was determined against bacteria and fungi in the presence and absence of 10 percent normal horse serum. The compound was tested against the organisms listed in the following table by two fold serial tube dilutions in Trypticase soya broth growth medium and incubation of the organisms for twenty-four hours at 37° C. The lowest concentration of N⁴,N⁴ - decamethylene-bis-(4-aminoquinaldine) diacetate which prevented visible growth after twenty-four hours of incubation at 37° C. was designated as the minimal inhibitory concentration. The results are shown in the table which follows.

ANTIBACTERIAL SPECTRA (IN VITRO)

[Minimum inhibitory concentration (mcg./ml.)]

| Test Organism | N⁴,N⁴′-Decamethylene-bis-(4-Aminoquinaldine) Diacetate-Dihydrate | |
|---|---|---|
| | Alone | + Serum |
| *Straphylococcus aureus* | 6.3 | 12.5 |
| *Streptococcus pyogenes* | 1.6 | 6.3 |
| *Escherichia coli* | 125.0 | 250.0 |
| *Pseudomonas aeruginosa* | 125.0 | 250.0 |
| *Candida albicans* | 10.0 | 10.0 |
| *Trichophyton mentagrophytes* | 100.0 | 100.0 |
| *Trichomonas vaginalis* | 10.0 | 10.0 |

In vivo studies with *Trichomonas vaginalis* were done in 18 to 20 gram white mice (ten per group) which were infected subcutaneously daily for three days with the organism. Each infection was followed two hours later by treatment with N⁴,N⁴′-decamethylene-bis-(4-aminoquinaldine) diacetate-dihydrate by the same route at doses of 1.0, 0.1, and 0.01 milligram per mouse in 0.5 milliliter of solution. Five days after the last infection-treatment regime, the animals were sacrificed and the infection sites were washed out with sterile saline and examined for viable trichomonads microscopically and by culture in simplified Trypticase soya serum base medium. The results showed that 10 mcg./mouse, the in vitro minimum inhibitory concentration, was sufficient to protect all ten animals in the test groups.

Also it has been found that unlike other topically useful anti-microbial agents, N⁴,N⁴ - decamethylene-bis-(4-aminoquinaldine) diacetate-dihydrate is not inactivated in the presence of sebum. The compound was tested in the agar cup plate zone inhibition test with 0.25 percent synthetic sebum emulsified in Eugon agar, and without synthetic sebum. The results showed that the size of the zone of inhibition was the same in the synthetic medium containing sebum as in the medium in which this material was not present, thus indicating that the synthetic sebum had no apparent effect on the activity of the salt. The microorganism used was *Staphylococcus aureus* 209.

In another in vitro experiment in which *Staphylococcus aureus* 209 was the microorganism, the number of viable bacteria per milliliter remained substantially constant in both the control and in the medium containing 0.25 percent synthetic sebum, but when 500 micrograms per milliliter of the water soluble salt of the present invention was added, the viable bacteria population decreased to zero (0) in sixty minutes under the same conditions. Surprisingly, in the medium containing both the salt of the present invention and 0.25 percent synthetic sebum, there were no viable bacteria found in the medium at the end of thirty minutes. Apparently, the presence of the sebum favorably influenced the antibacterial activity of the salt.

The compound of this invention may be prepared by the reaction of 1,10-diaminodecane with 4-chloroquinaldine in the presence of phenol at 150° C., i.e.

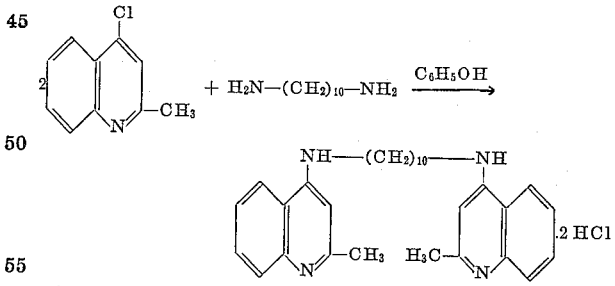

which gives the dihydrochloride salt. Upon liberation of the free base, the product is converted to the diacetate-dihydrate salt in methanol-ether solution.

EXAMPLE 1

*N⁴,N⁴′-decamethylene-bis-(4-aminoquinaldine) diacetate dihydrate*

In a five liter flask equipped with a stirrer, dropping funnel, and thermometer was placed 145 grams (1 mole) of 1,10-diaminodecane and 900 grams of phenol. The mixture was heated until the temperature of the melt reached 115° C., external heat was removed, and 300 grams (2.01 mole) of 4-chloroquinaldine was added at such a rate that the temperature did not rise above 150° C. After the addition of the 4-chloroquinaldine was completed, the reaction mixture was heated for an additional hour at 145° C. and then allowed to cool to room temperature. Upon addition of 1.2 liters of dry ether a solid precipitated. The solid was filtered and washed with ether to give the desired $N^4,N^{4'}$-decamethylene-bis-(4-aminoquinaldine) as the dihydrochloride salt melting at 120° C. to 126° C.

The hydrochloride salt was dissolved in 5 liters of hot methanol and the solution made alkaline by addition of 400 milliliters of 50 percent sodium hydroxide solution. Upon cooling, a solid separated, was filtered and washed with water, acetone and ether to give the desired $N^4,N^{4'}$-decamethylene-bis-(4-aminoquinaldine) melting at 181° C. to 185° C.

To a suspension of the free base, $N^4,N^{4'}$-decamethylene-bis-(4-aminoquinaldine), in 600 milliliters of methanol was added 80 milliliters of glacial acetic acid. The resulting solution was stirred and 2 liters of anhydrous ether added. Stirring was continued while the solution was cooled in an ice bath causing the separation of a solid. The solid was filtered, washed with ether and allowed to air dry to give a solid melting at 120° C. to 124° C. The product was then dissolved in hot methanol and decolorized with 1 gram of charcoal. After filtering, the solution was diluted with ether and the resulting solid further purified by an additional crystallization from methanol-ether to give the desired $N^4,N^{4'}$-decamethylene-bis-(4 - aminoquinaldine) diacetate dihydrate as an off-white solid melting at 125° C. to 130° C.

EXAMPLE 2

Five percent (5%) ointment

One hundred and twenty grams of glyceryl monostearate, 100 grams of white petrolatum, 25 grams of stearyl alcohol, 35 grams of a mixture of wool fat alcohols, and 10 grams of sorbitan monosterate are melted together. Separately, 5 grams of methylparaben, 100 grams of propylene glycol, 25 grams of polyoxyl 40 stearate, and 50 grams of $N^4,N^{4'}$-decamethylene-bis-(4-aminoquinaldine) diacetate dihydrate are dissolved in 530 milliliters of purified water and heated to 70° C. to 80° C. The aqueous phase is filtered and added to the oil phase at 70° C. to 80° C. with stirring. Sufficient purified water is added to the ointment to make a total of 1 kilogram.

EXAMPLE 3

One-tenth percent (0.1%) ointment

One hundred and twenty grams of glyceryl monostearate, 100 grams of white petrolatum, 25 grams of stearyl alcohol, 35 grams of a mixture of wool fat alcohols, and 10 grams of sorbitan monostearate are melted together. Separately, 5 grams of methylparaben, 100 grams of propylene glycol, and 25 grams of polyoxyl 40 stearate are dissolved in 530 milliliters of purified water and heated to 70° C. to 80° C. The aqueous phase is added to the oil phase at 70° C. to 80° C. with stirring. One gram of $N^4,N^{4'}$-decamethylene-bis-(4-aminoquinaldine) diacetate dihydrate is dissolved in 50 milliliters of purified water and heated to approximately 60° C. The solution is then filtered and added to the ointment with stirring. Sufficient purified water is added to the ointment to make a total of 1 kilogram.

EXAMPLE 4

Five-tenths percent (0.5%) lotion

Fifty grams of mineral oil and 30 grams of cetyl alcohol are heated to 70° C. to 80° C. Separately, 1.25 grams of propylparaben, 30 grams of polyoxyl 40 stearate, 10 grams of glycerin, 5.0 grams of $N^4,N^{4'}$-decamethylene-bis-(4-aminoquinaldine) diacetate dihydrate, and 550 milliliters of purified water are heated to approximately 75° C. and the solution is filtered. The aqueous phase is added to the oil phase with efficient mixing until the preparation has cooled.

EXAMPLE 5

One percent (1%) oral wash or spray

Three hundred milligrams of methylparaben and 200 milligrams of propylparaben are dissolved in 30 milliliters of alcohol. Ten grams of $N^4,N^{4'}$-decamethylene-bis-(4-aminoquinaldine) diacetate dihydrate is dissolved in a mixture of 200 milliliters of 0.1 M lactic acid-sodium lactate buffer solution of pH 5.5, 200 milliliters of glycerin, and 100 milliliters of purified water. The parabens solution is then added. A suitable flavor and certified F.D. and C. dye are added, followed by sufficient purified water to make a total volume of 1 liter. The solution is then filtered.

What is claimed is:

1. An antimicrobial composition for the control of topical infections by pathogenic microorganisms which comprises $N^4,N^{4'}$-decamethylene-bis-(4-aminoquinaldine) diacetate dihydrate in a carrier selected from the class consisting of ointments, lotions, oral washes and sprays which may be safely applied to the skin.

2. A method of controlling topical infections in animals which are caused by microorganisms which comprises applying to the infected site the compositions of claim 1.

References Cited

UNITED STATES PATENTS

| | | | |
|---|---|---|---|
| 2,791,582 | 5/1957 | Austin et al. | 167—65 XR |
| 3,026,322 | 3/1962 | Shock | 260—286 |
| 3,027,378 | 3/1962 | Stark | 260—286 |
| 3,147,182 | 9/1964 | Masci et al. | 167—58 XR |

FOREIGN PATENTS

| | | |
|---|---|---|
| 1,169,948 | 6/1961 | Germany. |

ALBERT T. MEYERS, *Primary Examiner.*

S. ROSEN, *Examiner.*

D. R. MAHANAND, *Assistant Examiner.*